(12) United States Patent
Kim et al.

(10) Patent No.: US 7,236,697 B2
(45) Date of Patent: Jun. 26, 2007

(54) DEVICE FOR DRIVING LIGHT EMITTING DIODE FOR FLASH OF CAMERA

(75) Inventors: Hyung Suk Kim, Kyungki-do (KR); Yong Chun Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 245 days.

(21) Appl. No.: 10/935,360

(22) Filed: Sep. 8, 2004

(65) Prior Publication Data

US 2005/0265709 A1    Dec. 1, 2005

(30) Foreign Application Priority Data

May 31, 2004    (KR)    ........................ 10-2004-0039093

(51) Int. Cl.
  *G03B 15/03*    (2006.01)
  *H04N 5/222*    (2006.01)
(52) U.S. Cl. .................. 396/157; 396/164; 348/371
(58) Field of Classification Search ................ 396/155, 396/157, 164, 182, 205; 348/370, 371
  See application file for complete search history.

(56) References Cited

U.S. PATENT DOCUMENTS

| 4,912,499 | A   |   | 3/1990  | Desormeaux     | 396/203 |
| 5,010,412 | A   | * | 4/1991  | Garriss        | 348/371 |
| 6,317,566 | B1  |   | 11/2001 | Kagaya et al.  | 396/176 |
| 7,052,151 | B2  | * | 5/2006  | Terada et al.  | 362/16  |
| 7,071,633 | B2  | * | 7/2006  | Gallagher et al. | 315/291 |
| 7,076,162 | B2  | * | 7/2006  | Yamashita      | 396/157 |
| 2003/0107656 | A1 | * | 6/2003  | Ito et al.    | 348/216.1 |
| 2004/0210112 | A1 | * | 10/2004 | Ota           | 600/180 |

FOREIGN PATENT DOCUMENTS

| JP | 4-63161      |   | 5/1992  |
| JP | 7-140377     | A | 6/1995  |
| JP | 2000-147615  | A | 5/2000  |
| JP | 2003-174587  |   | 6/2003  |
| JP | 2003-307771  |   | 10/2003 |
| JP | 2003-338973  |   | 11/2003 |

OTHER PUBLICATIONS

Japanese Patent Office, Office Action, mailed Jun. 27, 2006.
Japanese Patent Office, Office Action mailed Feb. 6, 2007.

* cited by examiner

*Primary Examiner*—W. B. Perkey
(74) *Attorney, Agent, or Firm*—Lowe Hauptman & Berner

(57) ABSTRACT

Disclosed herein is a device for driving a LED for a flash of a camera, such as a digital camera or a camera of a mobile phone, which is capable of driving the LED in two modes to reduce power consumption. The LED drive device comprises the LED, a continuous low current driver for continuously supplying current which is lower than or equal to rated current of the LED to the LED, a high-current pulse driver for supplying current which is higher than the rated current of the LED to the LED for a predetermined period of time, and a mode selector for selecting one of the continuous low current driver and the high-current pulse driver to drive the LED. According to the present invention, it is possible to prevent unnecessary power consumption and deterioration of reliability of the LED, and obtain an image of brighter picture quality.

6 Claims, 3 Drawing Sheets

DEVICE FOR DRIVING LIGHT EMITTING DIODE FOR FLASH OF CAMERA

RELATED APPLICATIONS

The present application is based on, and claims priority from, Korean Application Serial Number 2004-39093, filed May 31, 2004, the disclosure of which is hereby incorporated by reference herein in its entirety.

BACKGROUND OF THE INVENTION

1. Field of the Invention

The present invention relates to devices for driving flashes for photographing used in a camera, etc., and more particularly to a device for driving a light emitting diode (LED) for a flash of a camera, such as a digital camera or a small-size camera of a mobile phone, which is capable of driving the LED in two modes to reduce power consumption.

2. Description of the Related Art

With the popularization of digital cameras, recently, various mobile communication terminals, including mobile phones, have been marketed with small-size digital cameras contained therein. Flashes are provided in such digital cameras to supply light of an amount required for shooting at night.

A strobo which employs a xenon tube as a light emitting element is used as a flash in a general camera. The xenon tube emits light by being supplied with power previously charged on a main capacitor in response to a trigger signal. On the other hand, the charging of the main capacitor is performed just after the camera is powered on or after the strobo emits light, and requires a standby time of several seconds. For this reason, the strobo employing the xenon tube is disadvantageous in that the photographing cannot be performed for the standby time. Further, since the main capacitor is large in size, it is hard to apply the strobo employing the xenon tube to a small-size unit such as a mobile communication terminal.

Recently, an LED has been spotlighted as a light source replacing the xenon tube with the above problems. This LED is advantageous in that it requires no standby time, and is appropriate for miniaturization of an associated unit since it needs no large-size main capacitor.

An LED for a conventional camera flash is driven in such a manner that it continuously emits light of an amount necessary for photographing. That is, the LED continuously supplies light of an amount necessary for photographing even while a user determines a composition of a picture to be photographed. For this reason, for photographing in a very dark environment, high current must be continuously supplied to the LED in order to secure a desired amount of light for the photographing. In such a conventional LED drive system, an LED may continuously supply light of an amount desired for an image capture moment, resulting in an increase in current consumption. Moreover, current which is higher than rated current of the LED may be continuously supplied to the LED in order to secure the desired amount of light.

This conventional LED drive system has the disadvantage of significantly reducing the lifetime of a battery, particularly in a camera of a mobile communication terminal, due to unnecessary current consumption, and adversely affecting reliability of the LED due to the continuous supply of excessive current to the LED.

SUMMARY OF THE INVENTION

Therefore, the present invention has been made in view of the above problems, and it is an object of the present invention to provide a device for driving an LED for a flash of a camera, which is capable of driving the LED separately in two drive modes, one being a continuous low current supply mode and the other being a temporary high current supply mode, so as to reduce current consumption and enhance reliability of the LED.

In accordance with an aspect of the present invention, the above and other objects can be accomplished by the provision of a device for driving a light emitting diode (LED) for a flash of a camera, comprising: the LED; a continuous low current driver for continuously supplying current which is lower than or equal to rated current of the LED to the LED; a high-current pulse driver for supplying current which is higher than the rated current of the LED to the LED for a predetermined period of time; and a mode selector for selecting one of the continuous low current driver and the high-current pulse driver to drive the LED.

The current supplied from the high-current pulse driver may be a maximum of four times the rated current of the LED, and the predetermined time period may be 10 msec at maximum.

In accordance with another aspect of the present invention, there is provided a device for driving an LED for a flash of a camera, comprising: the LED having one end connected to a voltage source; a mode selector having a first terminal and a second terminal, the mode selector selectively connecting any one of the first and second terminals to a ground terminal; continuous low current drive means having one end connected to the first terminal and the other end connected to the other end of the LED; and high-current pulse drive means including a switching circuit for connecting the other end of the LED to the ground terminal for a predetermined period of time, and switching circuit control means connected between the second terminal and the switching circuit for providing a signal for control of the time period to the switching circuit.

Preferably, the continuous low current drive means is a resistor having one end connected to the first terminal and the other end connected to the other end of the LED.

Preferably, the switching circuit control means is an RC charging circuit which includes: a first resistor having one end connected to the voltage source and the other end connected to the second terminal; a second resistor having one end connected to the voltage source; and a capacitor having one end connected to the other end of the second resistor and the other end connected to the second terminal.

The switching circuit may include: a PNP transistor having a collector connected to the voltage source and a base connected to the other end of the second resistor; and an NPN transistor having a collector connected to the other end of the LED, a base connected to an emitter of the PNP transistor and an emitter connected to the ground terminal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
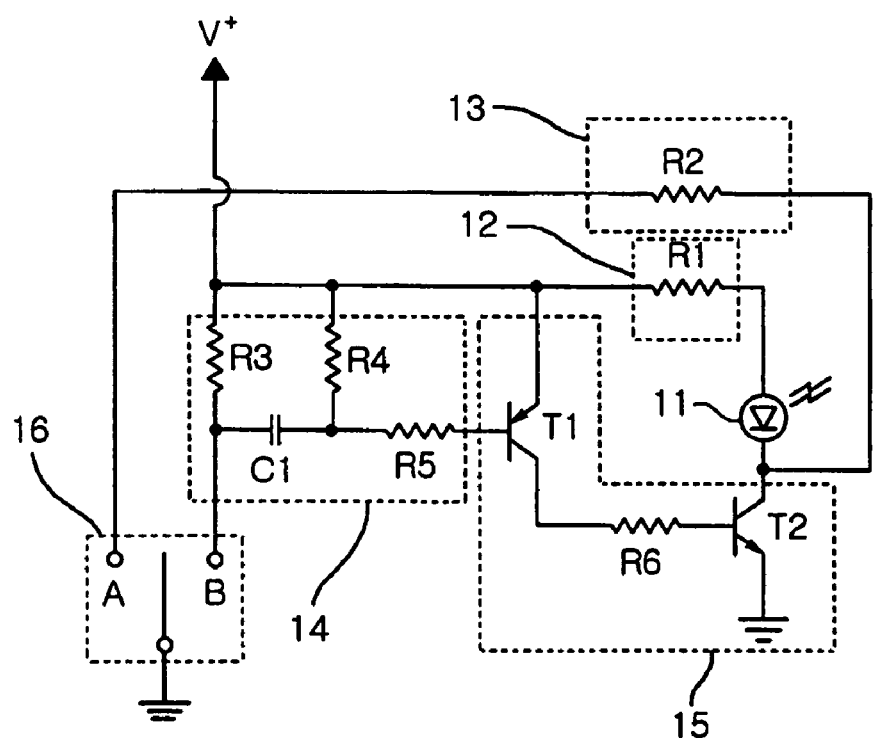
FIG. 1 is a circuit diagram showing the configuration of a device for driving an LED for a flash of a camera in accordance with a preferred embodiment of the present invention.

FIG. 1 is a circuit diagram showing the configuration of a device for driving an LED for a flash of a camera in accordance with a preferred embodiment of the present invention, wherein the LED is denoted by the reference numeral 11. As shown in this drawing, the LED drive device according to the preferred embodiment of the present invention comprises a continuous low current driver 13 for continuously supplying current which is lower than or equal to rated current of the LED 11 to the LED 11, a high-current pulse driver for supplying current which is higher than the rated current of the LED 11 to the LED 11 for a predetermined period of time, and a mode selector 16 for selecting one of the continuous low current driver 13 and the high-current pulse driver to drive the LED 11.

The LED 11 has one end connected to a voltage source V+ and the other end connected in common to the continuous low current driver 13 and the high-current pulse driver. The LED 11 is used as a light source of the flash and can be implemented with one high-brightness white LED or, alternatively, may comprise one or more LEDs for generation of white light. A bias circuit 12 is formed between the LED 11 and the voltage source V+ and is provided with a resistor R1.

The mode selector 16 has a first terminal A and a second terminal B and acts to selectively connect any one thereof to a ground terminal.

The continuous low current driver 13 has one end connected to the first terminal A and the other end connected to the other end of the LED 11. In the present embodiment, the continuous low current driver 13 is a resistor R2 having one end connected to the first terminal A and the other end connected to the other end of the LED 11.

The high-current pulse driver includes a switching circuit 15 for connecting the other end of the LED 11 to the ground terminal for the predetermined period of time, and a switching circuit controller 14 connected between the second terminal B and the switching circuit 15 for providing a signal for control of the time period to the switching circuit 15.

In the present embodiment, the switching circuit controller 14 is an RC charging circuit which includes a first resistor R3 having one end connected to the voltage source V+ and the other end connected to the second terminal B, a second resistor R4 having one end connected to the voltage source V+, and a capacitor C1 having one end connected to the other end of the second resistor R4 and the other end connected to the second terminal B.

The switching circuit 15 includes a PNP transistor T1 having a collector connected to the voltage source V+ and a base connected to the other end of the second resistor R4, and an NPN transistor T2 having a collector connected to the other end of the LED 11, a base connected to the emitter of the PNP transistor T1 and an emitter connected to the ground terminal.

The operation of the LED drive device with the above-stated configuration according to the preferred embodiment of the present invention will hereinafter be described with reference to FIGS. 1 and 2.

In the present embodiment, the LED is driven in two modes. The first mode is a continuous low current drive mode where, for photographing of a subject in a dark environment, the LED continuously emits light to illuminate the subject so that a composition of a picture to be photographed can be determined. The second mode is a high-current pulse drive mode where, after the picture composition is determined in the continuous low current drive mode, the LED emits a very high intensity of light to the subject for a brief period of time so that the subject can be photographed. In other words, the LED for the camera flash according to the preferred embodiment of the present invention is driven in such a manner that it continuously illuminates a subject in the continuous low current drive mode while a composition of a picture to be photographed is determined, and then emits a glint of light to the subject in the high-current pulse drive mode when the camera actually captures the image of the subject.

First, if the camera user selects the continuous low current drive mode using a switch, for example, a shutter, the mode selector 16 in FIG. 1 connects the first terminal A to the ground terminal. In this case, current from the voltage source V+ is supplied to the LED 11 via the resistor R1 of the bias circuit 12 and then drained to the ground terminal via the resistor R2 of the continuous low current driver 13. Current is continuously supplied to the LED 11 along this current path and the amount thereof is determined by properly adjusting the resistance of the resistor R2 which is the continuous low current driver 13.

Preferably, the supplied current is lower than or equal to the rated current of the LED 11. For example, in the case where the rated current of the LED 11 is 100 mA, as shown in FIG. 2, if the continuous low current drive mode is started (point A), current of 100 mA is continuously supplied to the LED 11 until the high-current pulse drive mode is started (point B).

Thereafter, if the camera user selects the high-current pulse drive mode using the switch to capture the image of a subject after determining a composition of a picture to be photographed in the continuous low current drive mode, the mode selector 16 in FIG. 1 connects the second terminal B to the ground terminal. At the moment that the second terminal B is connected to the ground terminal, the capacitor C1 begins to charge with a time constant of the resistors R3 and R4 and capacitor C1 of the RC charging circuit of the switching circuit controller 14. At the time the capacitor C1 begins to charge, the PNP transistor T1 of the switching circuit 15 is turned on and the NPN transistor T2 thereof is in turn turned on. In this case, the current from the voltage source V+ is supplied to the LED 11 via the resistor R1 of the bias circuit 12 and then drained to the ground terminal.

At the time the charging of the capacitor C1 based on the time constant of the resistors R3 and R4 and capacitor C1 of the RC charging circuit of the switching circuit controller 14 is completed, the PNP transistor T1 is turned off and the NPN transistor T2 is in turn turned off. As a result, the supply of current to the LED 11 is blocked. That is, since the charging time of the capacitor C1 is determined depending on the time constant of the resistors R3 and R4 and capacitor C1 of the RC charging circuit of the switching circuit controller 14, it can be adjusted by properly adjusting the resistances of the resistors R3 and R4 and the capacitance of the capacitor C1. As a result, the time period for which current is supplied to the LED 11 can be adjusted by adjusting the charging time of the capacitor C1.

At this time, the amount of current to be supplied to the LED 11 is determined depending on the resistance of the resistor R1 of the bias circuit 12. In the continuous low current drive mode, the amount of current to the LED 11 is reduced by the resistor R2 of the continuous low current driver 13. However, in the high-current pulse drive mode, current to the LED 11 is higher than that in the continuous low current drive mode because it is not passed through any elements other than the resistor R1 of the bias circuit 12.

Figure 2:
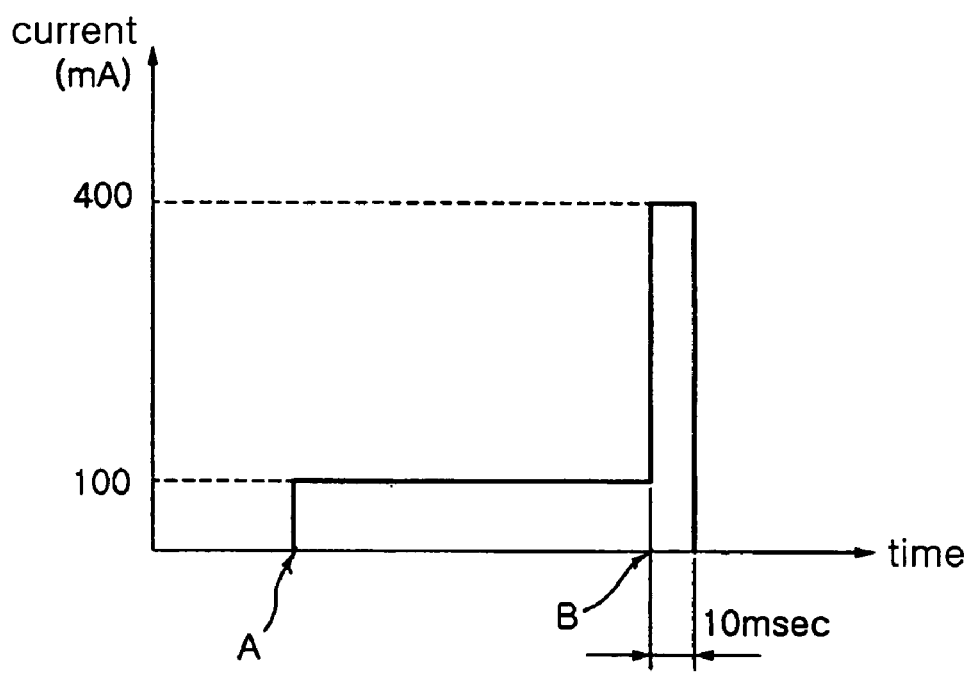
FIG. 2 is a graph illustrating operation characteristics of the LED drive device of FIG. 1.

As shown in FIG. 2, if the LED drive mode is changed from the continuous low current drive mode to the high-current pulse drive mode (point B), current higher than that in the continuous low current drive mode is supplied to the LED for a predetermined period of time. In order not to degrade reliability of the LED, the current supplied to the LED is preferably a maximum of four times the rated current of the LED and the current supply time period is 10 msec at maximum.

As described above, according to the present invention, the LED drive device employs the two modes, one to continuously supply low current to the LED to drive it while a composition of a picture to be photographed is determined, and the other to supply a high-current pulse to the LED to drive it for a brief period of time in which the image of a subject is captured. Therefore, since the LED drive device need not provide a high intensity of light necessary for image capture while a picture composition is determined, it can avoid waste of power and deterioration of reliability of the LED. In particular, the temporary provision of high current to the LED enables a larger amount of light to be secured and, thus, an image of brighter picture quality to be obtained.

Figure 3:
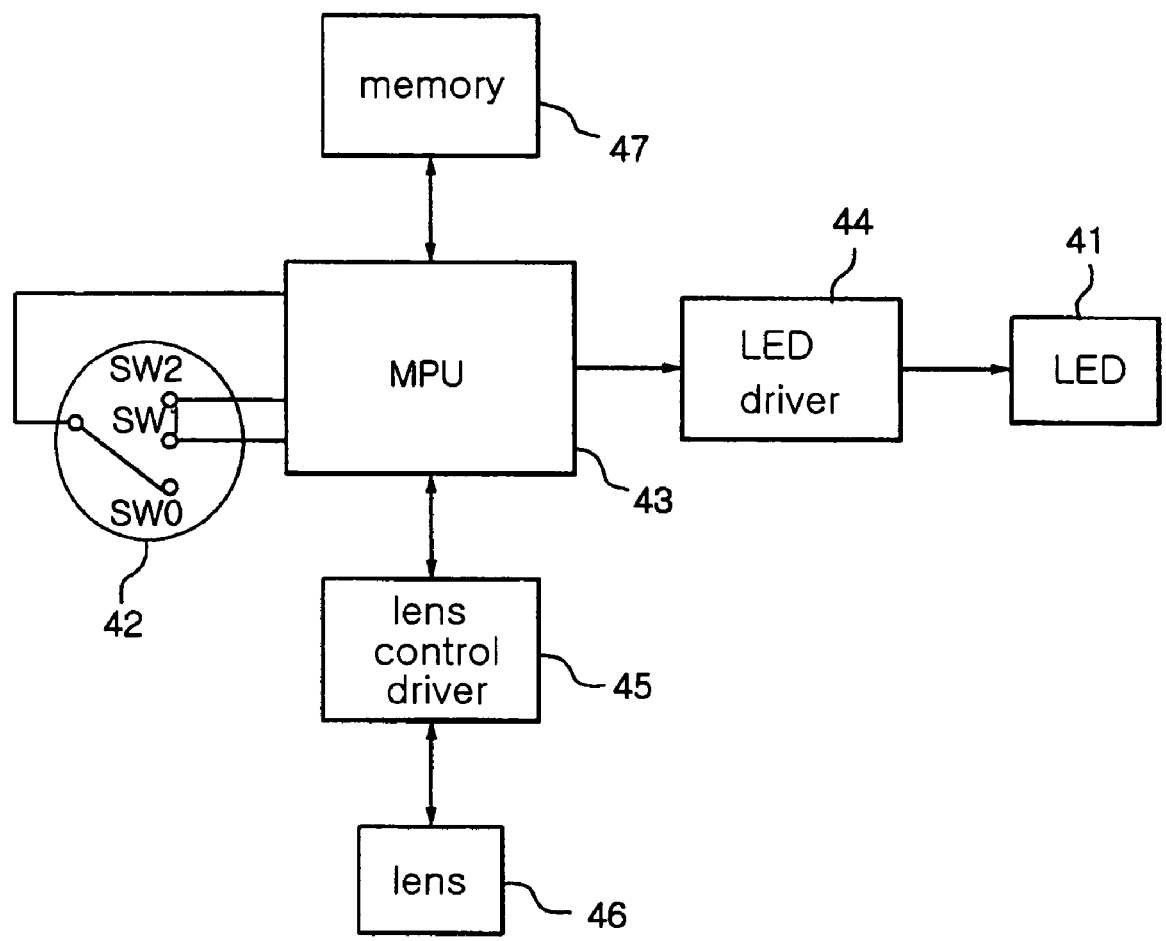
FIG. 3 is a block diagram showing an example to which the present invention is applied.
Figure 4:
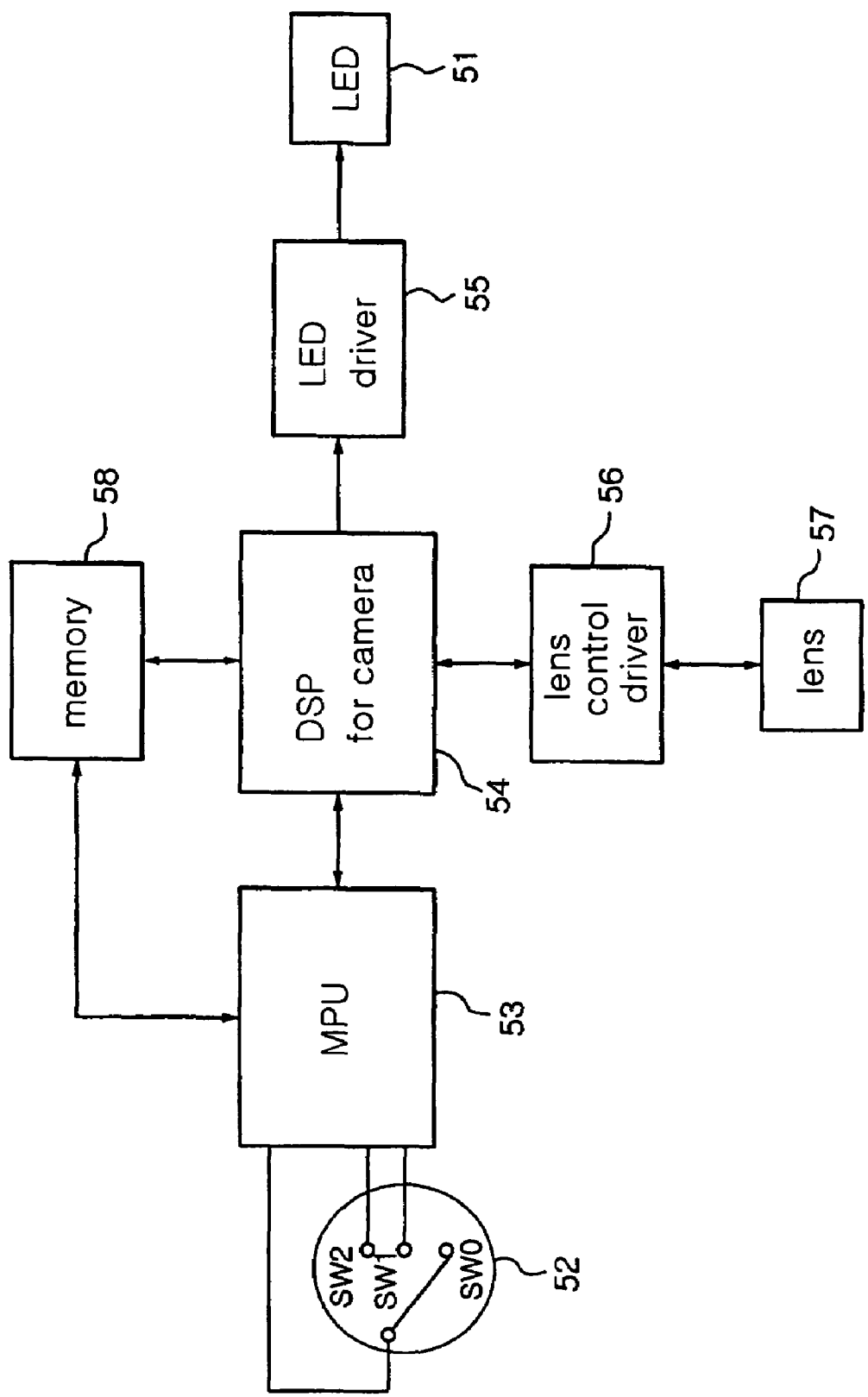
FIG. 4 is a block diagram showing another example to which the present invention is applied.

FIGS. 3 and 4 show examples of a digital camera and mobile phone camera to which the present invention is applied.

FIG. 3 is a block diagram of a digital camera to which the present invention is applied. In this drawing, the constituent elements of the LED drive device of the present invention are applied separately to a micro processing unit (MPU) 43 and an LED driver 44. Preferably, the mode selector of the present invention is included in the MPU 43 and the continuous low current driver and high-current pulse driver of the present invention are included in the LED driver 44.

A description will hereinafter be given of the operation of the digital camera to which the present invention is applied.

First, the user selects the continuous low current drive mode to photograph a subject in a dark environment. The user's selection can be made through a shutter 42 of the camera. This shutter 42 is a general shutter of two modes, a half-depression mode and a full-depression mode. The half-depression mode (SW1 mode) of the shutter 42 is set to select the continuous low current drive mode and the full-depression mode (SW2 mode) thereof is set to select the high-current pulse drive mode. If the user sets the shutter 42 to the half-depression mode (SW1 mode), the MPU 43 reads a current value of the continuous low current drive mode pre-stored in a memory 47 and transfers the read current value to the LED driver 44. The LED driver 44 supplies, to an LED 41, current of an amount corresponding to the continuous low current drive mode current value transferred from the MPU 43. At this time, the amount of light incident on a lens 46 is read by a lens control driver 45 and then transferred to the MPU 43. The MPU 43 reads an iris opening time corresponding to the transferred light amount from the memory 47.

Thereafter, if the user sets the shutter 42 to the full-depression mode (SW2 mode) to capture the image of the subject after determining a composition of a picture to be photographed, the MPU 43 transfers the read iris opening time to the lens control driver 45 to drive the iris of the lens 46 so as to capture a desired image. The MPU 43 also transfers the iris opening time and a current value of the high-current pulse drive mode pre-stored in the memory 47 to the LED driver 44 so that the LED 41 can be driven synchronously with the iris opening time. Then, the LED driver 44 supplies current of an amount corresponding to the high-current pulse drive mode current value transferred from the MPU 43 to the LED 41 for the iris opening time transferred from the MPU 43. As a result, the LED 41 emits a glint of light to the subject for the period of time in which the camera captures the image of the subject.

FIG. 4 is a block diagram of a mobile phone to which the present invention is applied. In this drawing, the constituent elements of the LED drive device of the present invention are applied separately to a digital signal processor (DSP) 54 for a camera and an LED driver 55. Comparing the configuration of the mobile phone shown in FIG. 4 with that of the digital camera shown in FIG. 3, the camera processor 54 for camera control is additionally provided in the mobile phone. Generally, the camera processor 54 is additionally provided since a main processor 53 of the mobile phone has to perform voice and text communication functions, etc. other than the camera control. In connection with the camera control, the main processor 53 just acts to transfer a shutter input (or keypad input in the mobile phone) to the camera DSP 54.

The LED drive operation of the mobile phone in FIG. 4 is performed in the same manner as that of the digital camera in FIG. 3, as stated above, with the exception that the camera DSP 54 performs the operation of the MPU 43, and a description thereof will thus be omitted.

As stated previously, according to the present invention, the LED drive device employs the two modes, one to continuously supply low current to the LED to drive it while a composition of a picture to be photographed is determined, and the other to supply a high-current pulse to the LED to drive it for a brief period of time in which the image of a subject is captured. Thus, the LED drive device need not provide a high intensity of light necessary for image capture while a picture composition is determined, thereby avoiding waste of power and deterioration of reliability of the LED.

As apparent from the above description, the present invention provides a device for driving an LED for a flash of a camera, which is capable of driving the LED separately in two drive modes, one being a continuous low current supply mode where low current is continuously supplied to the LED to drive it while a composition of a picture to be photographed is determined, and the other being a temporary high current supply mode where a high-current pulse is supplied to the LED to drive it for a brief period of time in which the image of a subject is captured. Therefore, the present invention has the effect of preventing unnecessary power consumption and deterioration of reliability of the LED, and obtaining an image of bright picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for driving an LED for a flash of a camera, comprising:
   said LED having one end connected to a voltage source;
   a mode selector having a first terminal and a second terminal, said mode selector selectively connecting any one of said first and second terminals to a ground terminal;
   continuous low current drive means having one end connected to said first terminal and the other end connected to the other end of said LED; and
   high-current pulse drive means including a switching circuit for connecting said other end of said LED to said ground terminal for a predetermined period of time, and switching circuit control means connected between said second terminal and said switching circuit for providing a signal for control of the time period to said switching circuit.

2. The device as set forth in claim 1, wherein said continuous low current drive means is a resistor having one end connected to said first terminal and the other end connected to said other end of said LED.

3. The device as set forth in claim 1, wherein said switching circuit control means is an RC charging circuit, said RC charging circuit including:
   a first resistor having one end connected to said voltage source and the other end connected to said second terminal;
   a second resistor having one end connected to said voltage source; and
   a capacitor having one end connected to the other end of said second resistor and the other end connected to said second terminal.

4. The device as set forth in claim 3, wherein said switching circuit includes:
   a PNP transistor having a collector connected to said voltage source and a base connected to said other end of said second resistor; and
   an NPN transistor having a collector connected to said other end of said LED, a base connected to an emitter of said PNP transistor and an emitter connected to said ground terminal.

5. The device as set forth in claim 1, wherein a current that flows through said LED by connecting said other end of said LED to said ground terminal for a predetermined period of time is a maximum of four times rated current of said LED.

6. The device as set forth in claim 1, wherein said predetermined time period is 10 milliseconds at maximum.

* * * * *